(12) United States Patent
Durney et al.

(10) Patent No.: US 6,467,522 B1
(45) Date of Patent: Oct. 22, 2002

(54) EDGE BANDING APPARATUS AND METHOD

(75) Inventors: Max W. Durney, Penngrove; David P. Cole, Kenwood, both of CA (US)

(73) Assignee: Castle, Inc., Petaluma, CA (US)

( * ) Notice: Subject to any disclaimer, the term of this patent is extended or adjusted under 35 U.S.C. 154(b) by 0 days.

(21) Appl. No.: 09/361,552

(22) Filed: Jul. 27, 1999

(51) Int. Cl.⁷ .......................... B32B 31/00; B32B 35/00
(52) U.S. Cl. .......................... 156/355; 156/64; 156/351; 156/354; 156/378; 156/468; 156/475; 156/522; 156/529; 156/908; 118/40; 118/41; 118/42; 118/500; 118/DIG. 3; 73/1.73; 73/290 R
(58) Field of Search .................................. 156/107, 109, 156/522, 529, 468, 908, 351, 378, 64, 354, 475; 83/56, 341, 483, 471.2, 614; 73/1.73, 290 R; 118/40, 41, 42, 500, DIG. 3

(56) References Cited

U.S. PATENT DOCUMENTS

| | | | |
|---|---|---|---|
| 2,646,104 A | * 7/1953 | Hawkes | 156/354 |
| 3,011,932 A | * 12/1961 | Downing | 156/249 |
| 3,089,534 A | * 5/1963 | Schuler et al. | 156/357 |
| 3,093,396 A | * 6/1963 | Segreto | 412/16 |
| 3,473,988 A | * 10/1969 | Rullier et al. | 156/107 |
| 3,496,817 A | * 2/1970 | Staats et al. | 83/56 |
| 3,595,203 A | * 7/1971 | Fabulich | 119/683 |
| 3,753,832 A | * 8/1973 | Veneziali | 156/499 |
| 4,222,812 A | * 9/1980 | Duewel | 156/497 |

FOREIGN PATENT DOCUMENTS

| | | | |
|---|---|---|---|
| JP | 64-74420 | * | 3/1989 |
| JP | 1-95002 | * | 4/1989 |
| JP | 2-259428 | * | 10/1990 |

* cited by examiner

*Primary Examiner*—Linda Gray
(74) *Attorney, Agent, or Firm*—Dorsey & Whitney LLP; Robert B. Chickering (57) ABSTRACT

An edge banding apparatus (21) for adhesively securing banding material (28) to an edge of a board (27). The apparatus (21) includes a board support structure (22) formed to support a board (26) in a near vertical orientation with the edge (27) to be banded in a downwardly facing orientation. An adhesive applying assembly (23) is positioned relative to the board support structure (22) and is formed to apply adhesive (54) to the downwardly facing edge (27) during relative motion between the board (26) and the adhesive applying assembly (23). The apparatus (21) includes a banding material applying assembly (24) positioned downstream of the adhesive applying assembly (23) and formed to apply a banding material (28) to the edge after the adhesive (54) is applied and a cutoff assembly (25) which cuts off the banding material (28) as the banded board (26) passes the cutoff device (25). Pneumatic adhesive level sensing assembly (71) and a pneumatic adhesive refilling assembly are both disclosed, as is a method of edge banding a board (26).

11 Claims, 5 Drawing Sheets

EDGE BANDING APPARATUS AND METHOD

TECHNICAL FIELD

The present invention relates, in general, to apparatus for adhesively securing veneer or banding material to boards and panels, and more particularly, relates to an apparatus and method for adhesively securing banding material strips to the edges of a board or panel.

BACKGROUND ART

In many furniture applications, boards or panels, and particularly veneer-covered boards and panels, have an edge strip of banding material secured to the edges of the board or panel to prevent unsightly edges from being exposed in the final product. Typically such edge banding strips are adhesively secured, usually hot-glued, to the board or panel edge by an edge banding apparatus or machine.

The board or panel may be a wooden member or a composite member and may, or may not, have a veneer layer on one of the front and/or back surfaces thereof. As used herein, however, the expression "board" shall include wooden and composite substrates, members, panels or boards, and may even include plastic substrates. Such "boards" may or may not include front and/or rear surface veneer layers on them.

Prior art edge banding apparatus typically are formed to support the board to be edge banded in a generally horizontal orientation. They include applicator assemblies which apply adhesive, usually hot adhesive, to a generally vertically oriented edge of the horizontal board from an adhesive reservoir having a heating element in the reservoir. Since the adhesives most commonly used must be heated to a very high temperature, for example, 200° C., handling of the hot adhesive is difficult and dangerous.

There are constant problems with hot adhesive slump or running off of the adhesive from the adhesive applicator and/or the board edge. Usually a roller or dispensing wheel mounted to rotate about an horizontal axis is used to apply the hot adhesive, and compensating for adhesive slump can be difficult. Other adhesive handling problems arise when using prior edge banding equipment. Thus, changing adhesive colors and refilling the adhesive reservoir have both caused safety and time consumption problems.

Still further, such prior art edge horizontal banding devices have required considerable floor space, for example, in order to support a horizontally oriented 4 foot by 8 foot panel during edge banding. Panel or board handling using prior art apparatus also has not been very ergonomic, causing undue worker fatigue. Additionally, in woodworking or furniture manufacturing facilities, wood dust is a serious problem, and prior art edge banding apparatus have had many horizontal surfaces on which dust and debris can accumulate.

Another problem encountered in prior art edge banding apparatus has been that the rough trim or banding material cutoff assembly has been either a scissors or guillotine type of device which can present a safety hazard. These trim devices typically project a cutting blade through the direction of travel of the board to create a pinch point which cannot be well guarded.

Accordingly, it is an object of the present invention to provide an edge banding apparatus and method which is more ergonomic, has more uniform and reliable adhesive application, and is easier and safer to operate.

Another object of the present invention is to provide an edge banding apparatus which requires less floor space, has fewer horizontally oriented dust-collecting surfaces and employs the weight of the board being edged to enhance securement of the banding material to the board edge.

Still another object of the present invention is to provide an apparatus and method for sensing the level of adhesive in a relatively small adhesive reservoir for the edge banding apparatus and to periodically automatically refill the adhesive reservoir based upon the level sensed.

Another object of the present invention is to provide an adhesive applying assembly in which the adhesive reservoir and heating device are separable elements.

A further object of the present invention is to provide an improved adhesive dispensing assembly and method for dispensing adhesive in an edge banding apparatus.

It is also an object of the present invention to provide a banding material cutoff assembly or rough trim device which can cutoff the edge banding material without exposing the operator to a safety hazard.

The edge banding apparatus and method of the present invention have other objects and features of advantage which will be set forth in more detail in, or will be apparent from, the following Best Mode of Carrying Out the Invention and the accompanying drawing.

DISCLOSURE OF THE INVENTION

The edge banding apparatus of the present invention comprises, briefly, a board support structure formed to support a board to be edge-banded in a near vertical orientation with an edge of the board to be banded in a downwardly facing orientation, an adhesive applying assembly positioned relative to the board support structure and formed to apply adhesive to the downwardly facing edge during relative movement between the board and the adhesive applying assembly, and a banding material applying assembly formed to apply a banding material to the board edge after application of the adhesive and during relative movement between the board and the banding material applying assembly. In the preferred embodiment the board is supported on the board support structure for movement of the board and downwardly facing edge over the top of a roller adhesive applicator and over the top of a banding material applying roller. Subsequent pressing rollers press the applied banding material against the adhesive on the board edge using the weight of the board to effect such pressing.

In another aspect of the invention, a pneumatic sensing apparatus is provided to sense the level of viscous adhesive in an adhesive reservoir of the edge banding apparatus in order that the reservoir can be periodically refilled. Moreover, a pneumatically operated granular adhesive dispensing assembly is coupled to receive signals from the level sensing apparatus in order to refill the adhesive reservoir.

The method of adhesively securing a banding material to the edge of a board of the present invention is comprised, briefly, of the steps of orienting the board to be edge-banded in a substantially vertical orientation with the edge to be banded facing downwardly, applying adhesive to the downwardly facing edge during relative movement between the board and an adhesive applicator, thereafter applying a banding material to the downwardly facing edge over the adhesive, and pressing the banding material against the edge, preferably by using, in part, the weight of the board against a pressing surface, such as pressing rollers.

Methods of pneumatic adhesive level sensing and pneumatic adhesive dispensing also are provided.

BEST MODE OF CARRYING OUT THE INVENTION

Figure 1:
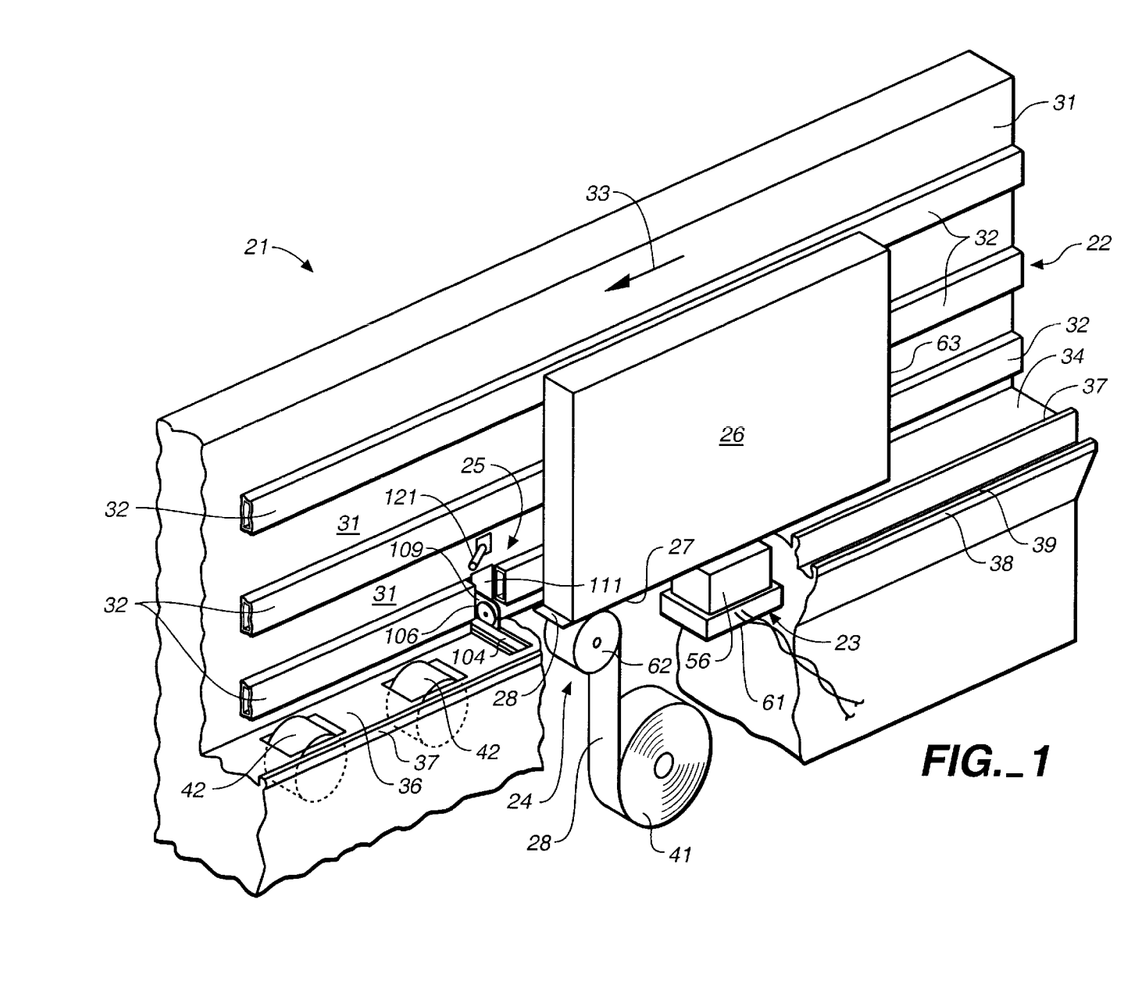
FIG. 1 is a top pictorial view, partially broken away, of a schematic representation of an edge banding apparatus constructed in accordance with the present invention.
Figure 2:
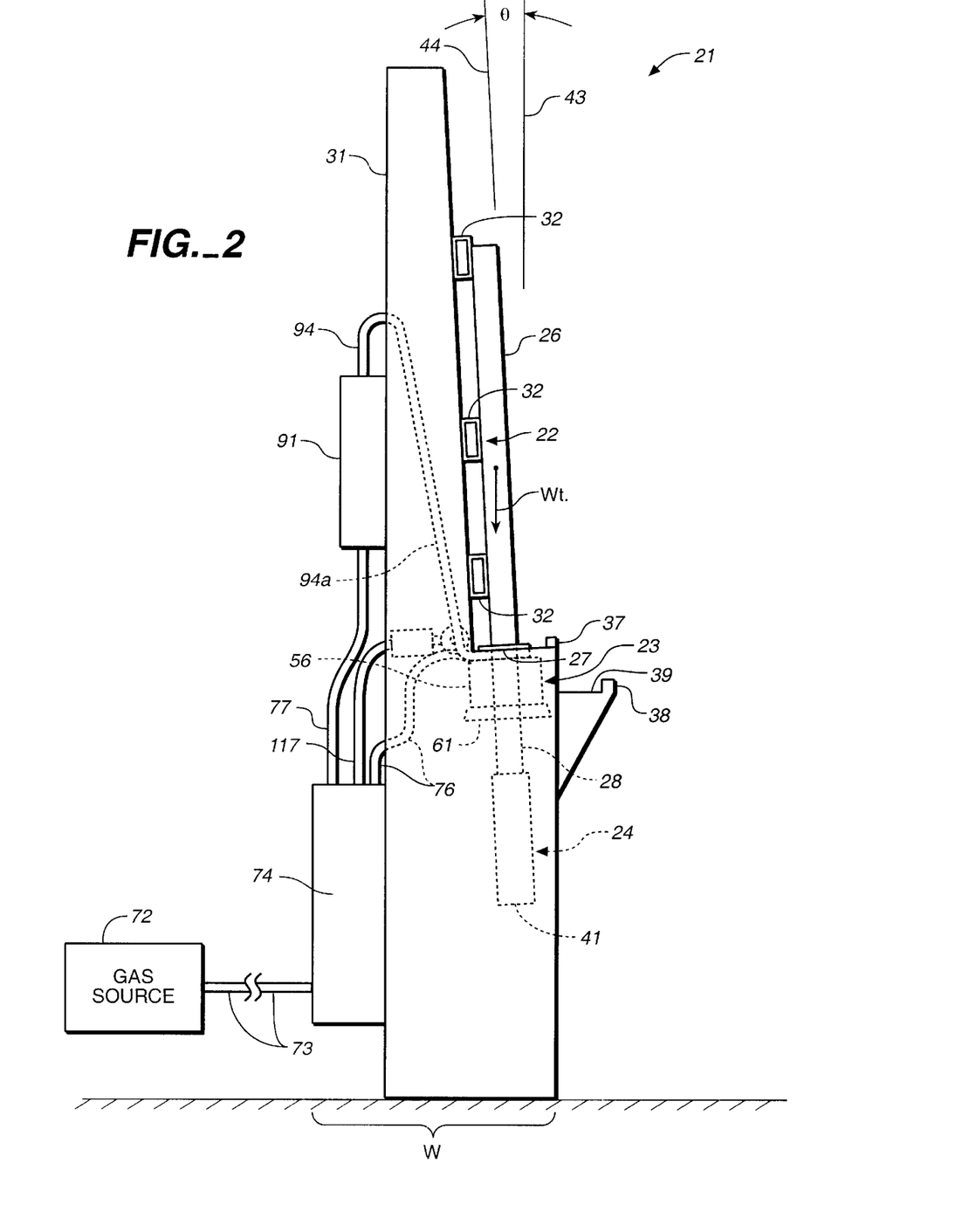
FIG. 2 is an end elevation view of the banding apparatus of FIG. 1.

Referring now to FIGS. 1 and 2, a preferred form of the edge banding apparatus, generally designated 21, of the present invention is illustrated. The present apparatus includes a board supporting structure, generally designated 22, an adhesive applying assembly, generally designated 23, a banding material applying assembly, generally designated 24, and a banding material cutoff assembly, generally designated 25. Assemblies for performing these functions are all broadly known in the prior art and do not, per se, constitute a novel aspect of the present invention.

In banding apparatus 21, however, board support structure 22 is formed to support a board 26 in a new or different orientation, namely, in a substantially or near vertical orientation with an edge 27 of the board to be banded in a downwardly facing orientation for application of a banding material 28 thereto. In prior art edge banding apparatus, board 26 is supported by a board supporting structure which orients the board in a generally horizontal plane with the edge to be banded oriented in a near vertical plane. There are several disadvantages from such a board orientation. One disadvantage of such prior art edge banding apparatus is that they require an undesirable amount of floor space. As can be seen in FIG. 2, the width dimension, W, of edge banding apparatus 21 of the present invention can be relatively narrow, for example, as compared to the height of board 26. If board 26 were supported on a horizontal surface, width dimension, W, of the banding apparatus would be much greater.

Another advantage of the present board support structure, which vertically orients the board 26, is that there is a substantial ergonomic advantage in terms of handling board or panel 26 in that the weight of the board, Wt., is oriented so as to press downwardly against the banding material 28 to thereby insure that it is firmly secured to edge 27 of the board. The operator, of course, can manually apply additional downward pressure on board 26 in order to ensure that banding material 28 is firmly pressed against the adhesive on edge 27. Additionally, vertical board supporting structure 22 presents fewer horizontally oriented surfaces on which the dust and airborne debris typically found in a wood working or furniture manufacturing facility can collect. Finally, vertical orientation of board 26 by support structure 22 results in a more uniform and reliable application of adhesive to edge 27, in a manner which will be described below.

Board support structure 22 can take several forms, but in the preferred embodiment, a generally vertically oriented wall-like structure 31 is provided to which box channels or board-engaging member 32 can be secured. The channels space the board outwardly of the wall 31 so that the operator, standing facing wall 31 (the right side of FIG. 2), can manually grip the board and move it in the direction of arrow 33 along board support structure 22.

The board support structure also includes near horizontal surface 34 which supports edge 27 of board 26 in advance of adhesive applying assembly 23 and banding material applying assembly 24. Such horizontal support continues at 36 downstream of the adhesive and band applying assemblies. It is preferred that a small flange or rail 37 extend upwardly at. the outer edges of surfaces 34 and 36 over the length of these horizontal surfaces so that lower edge 27 of board 26 cannot slip outwardly toward the operator who is manipulating the board. Moreover, in the preferred embodiment, a second rail 38 and horizontal support surface 39 can be provided to enable the operator to temporarily set the board on surface 39 prior to edge banding, for example, while replacing the roll 41 of banding material 28. The secondary support surface 39 can be provided over the full length of edge banding apparatus 21 or merely on the end upstream of the adhesive and banding applying assemblies.

As illustrated, edge banding apparatus 21 is designed for manual operation by a user who grips board 26 and slides it along support surfaces 32, 34 and 36 in the direction of arrow 33. It will be understood, however, that movement of board 26 also could be powered, for example, by providing powered rollers along the length of surfaces 34 and 36. In the illustrated version, there are pressing rollers 42 which extend above surface 36 to press banding material 28 against edge 27, but these pressing rollers are shown as being passive or unpowered rollers. It would be a simple matter to power them and add similar drive rollers in surface 34 so that board 26 can be driven by the operator along the length of board support structure 22 of edge banding apparatus 21. Moreover, powered or idler rollers also could be provided in wall support structure 31 instead of, or in addition to channels 32. Since there is little weight on channels 32, however, there is little frictional resistance to sliding of the board therealong, and rollers in wall 31 are not required for smooth movement of the board along board supporting structure 22.

Referring now to FIG. 2, it will be seen that in the preferred form of the edge banding apparatus board support structure 22 is formed to tilt board 26 from a vertical plane 43 to a plane 44 by an amount sufficient to stabilize board 26 as it is moved along support structure 22 against falling toward the operator. Preferably, a tilt in the range of about 3° to about 10° toward the board supporting wall 31 provides sufficient stability for sliding movement of board 26 along support structure 22, while still maintaining most of the weight of the board oriented in a downward direction through edge 27. As the angle θ increases, the advantage of the board weight pressing edge banding material 28 against the applied glue and board edge diminishes, and the width dimension, W, of the assembly, as well as the number of horizontal surfaces, increases. The angle θ, however, could be as high as 30° without departing from the spirit and scope of the present invention, and the expression "near vertical," as used herein, shall include 60° to 90° from a horizontal plane.

Figure 3:
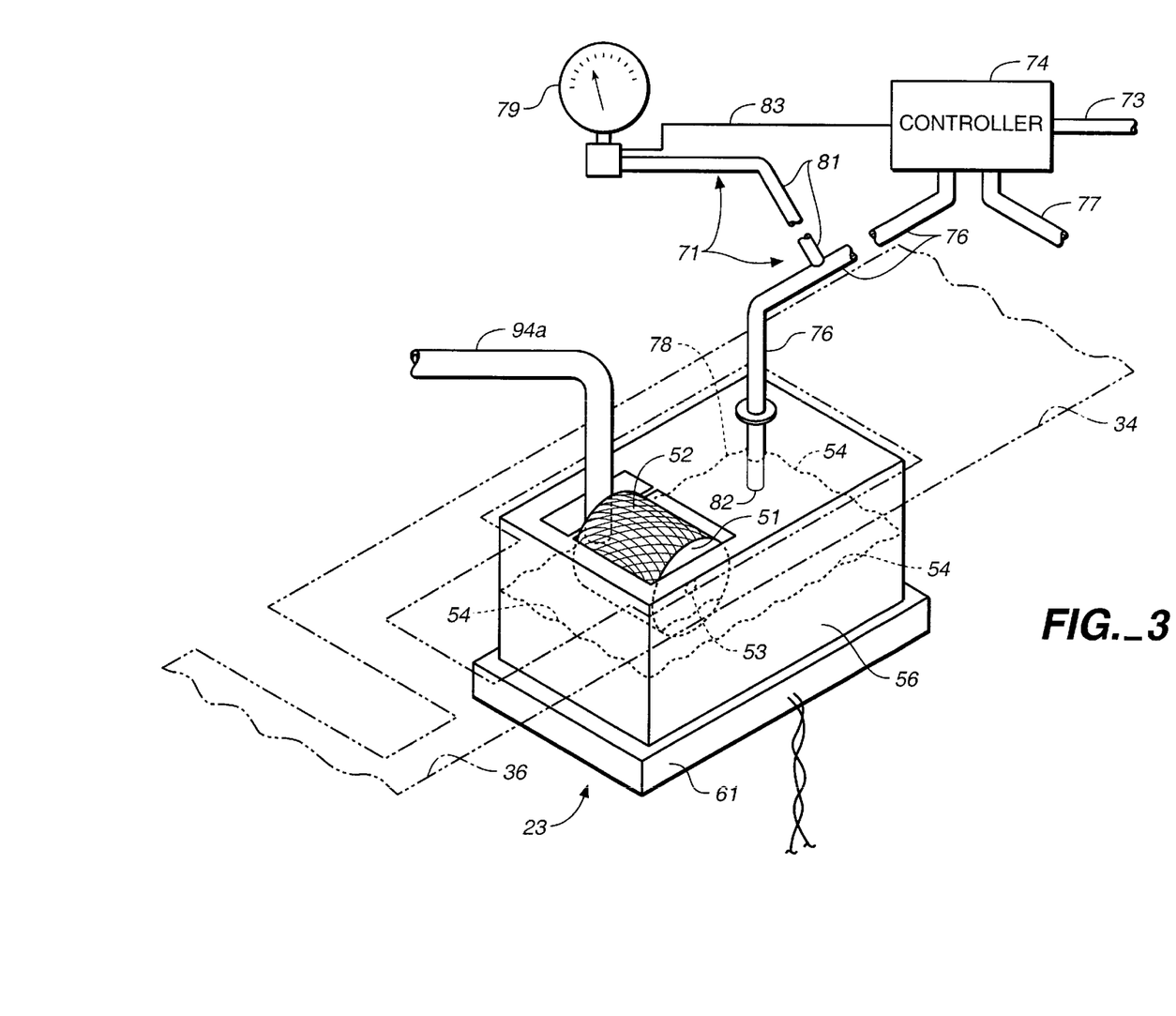
FIG. 3 is an enlarged, top pictorial view of a schematic representation of an adhesive applicator assembly suitable for use in the edge banding apparatus of FIGS. 1 and 2, with a portion of the board support structure shown in phantom.

One of the further important aspects of orienting board 26 in a generally vertical plane is that adhesive applying assembly 23 will more reliably and uniformly apply adhesive to edge 27. A roller applicator 51 (FIG. 3) having an adhesive-applying peripheral surface 52 can be generally horizontally oriented with applicator roller 51 mounted for rotation about a generally horizontal axle 53. The roller, therefore, progressively rotates down through an adhesive 54 contained within an adhesive reservoir 56. As peripheral surface 52 rolls upwardly from adhesive 54 it carries adhesive 54 on surface 52, which rollingly engages edge 27 of board 26 so as to apply the adhesive to the board edge. In the preferred form, surface 52 can be knurled so that the viscous liquid adhesive will be carried up from the reservoir into contact with board edge 27. In conventional edge banding apparatus, roller applicators have peripheral glue applying surfaces which are vertically oriented. Adhesive 54 typically will be a heat activated adhesive, such as JOWAT brand hot melt glue, which comes in a granular form but turns into a viscous liquid at high temperatures, for example, 200°–250° C. Thus, on vertically oriented prior art roller applicator surfaces, there is a tendency for the viscous liquid adhesive to slump or run off of the vertical wheel, with the result that the upper portion of the board edge to which glue is being applied can have insufficient or even missing adhesive. This can be exacerbated by the vertical orientation of the board edge. In the orientation of roller applicator 51 as shown in FIG. 3, however, adhesive can be readily carried up by roller surface 52 onto edge 27 in a manner which is uniform across the width of edge 27. Thus, prior art mechanisms for insuring uniform adhesive distribution on the applicator roller are not required in the present invention as a result of the near horizontal orientation of roller 51 and the near horizontal orientation of board edge 27.

Moreover, adhesive applying assembly 23 of the present invention is formed in a manner which provides greater flexibility in selection and changing of the adhesive being used. In prior art systems, the heating element for the adhesive often is mounted in the adhesive reservoir 56. In the present invention, a heating plate 61 can be positioned under reservoir 56, with the reservoir merely removably sitting on top of heating plate 61. Thus, it is a simple matter to remove reservoir 56 from heating plate 61, for example, to replace the reservoir 56 with another reservoir containing an adhesive having a different color. Various adhesive colors are employed since on certain edges the adhesive color may be minutely visible. In edge banding apparatus having a heating element emersed in the adhesive in the reservoir, changing adhesive color is much more difficult.

It is also a feature of the present invention that adhesive reservoir 56 is relatively small, for example, about 10–20 cubic inches. This enables the relatively small volume of adhesive in reservoir 56 to be rapidly heated at start up and provides for a shorter residence time of the adhesive in the reservoir for less heat degradation.

Returning now to FIG. 1, it will be seen that adhesive reservoir 56 and heating plate 61 are immediately in advance of banding material applying assembly 24. It would also be possible to put a plurality of adhesive applying assemblies 23 sequentially along support surface 34 in advance of banding material applying assembly 24. This would allow adhesives of various colors to be available to the operator without replacement of adhesive reservoirs 56. The operator would simply selectively turn "on" the heating plate 61 of a selected reservoir so as to cause the solid adhesive of the desired color to liquify and be carried up on an applicator roller 51 to the edge 27 of board 26. The small size of reservoir 56 enables a plurality of reservoirs to be used.

Downstream of adhesive applicator assembly 23 is a banding material applying assembly 24. As used herein, "downstream" means in the direction of arrow 33 so that after adhesive 54 has been applied to edge 27 of the board, then banding material 28 can be applied to edge 27 over adhesive 54. In the preferred form, banding material applicator 24 can be provided by a roll 41 of veneer or banding material 28 which is fed up over an applicator roller 62 so as to press the banding material against the adhesive-carrying edge 27 of board 26.

Additional pressing rollers 42 downstream of roller 62 project through surface 36 and use the weight of board 26 to press banding material 28 against the hot adhesive applied to edge 27. Both roll 41 and roller 62 are shown as idler or unpowered rollers, but it will be understood that they could also be powered in coordination with movement of board 26 along structure 22.

Alternatively, it would also be possible to support board 26 in a near vertical orientation on support structure 22 and move adhesive applying assembly 23 and banding material applying assembly 24 relative to board 26. This could be accomplished by placing assemblies 23 and 24 on a common carriage and moving the carriage in a direction opposite to arrow 33 along edge banding apparatus 21 underneath downwardly facing edge 27. Thus, only relative motion between edge 27 and the adhesive applying and banding material applying assemblies is required within the broadest aspect of the present invention. One could even move both the board and the adhesive and banding applying assemblies to produce relative motion.

One of the constant problems which has been encountered in connection with prior art edge banding apparatus has been the problem of trying to automate refilling of adhesive reservoir 56. The edge banding apparatus of the present invention includes a level sensor which is particularly well suited for sensing the level of viscous liquids, such as heat-activated adhesives, as well as an adhesive dispenser which can be coupled to the level sensor and employed to periodically refill reservoir 56 with adhesive granules.

Referring now to FIG. 3, a level sensing apparatus 71 is shown which is suitable for sensing the level of a viscous liquid, such as an adhesive, in a liquid reservoir. While various adhesive level sensing devices would be suitable for use in the edge banding apparatus of the present invention, including, e.g., optical, ultrasonic mechanical and pressure sensors, the present level sensing apparatus is pneumatically based. Level sensor 71 includes a source of gas under pressure 72 (FIG. 2), which can be a part of apparatus 21 or a compressed gas source, such as compressed air source, of the wood working or furniture manufacturing facility in which the present apparatus is operated. A conduit 73 extends from source 72 to a pneumatic controller 74. Controller 74 includes pneumatic valve assembly and two output conduits 76 and 77. Output conduit 76 acts as a gas discharge conduit mounted for discharge of pressurized gas into viscous adhesive liquid 54 at a position below the top surface 78 of the adhesive. A pressure sensor 79 is coupled by conduit 81 to the gas discharge conduit 76 so as to enable sensing of the pressure in the gas discharge conduit. Controller 74 preferably is a combination of pneumatic valves and electronic control circuitry which can be used to control the discharge of gas into the viscous liquid, such as adhesive 54. Thus, the controller opens a pneumatic valve coupling the gas source 72 to gas discharge conduit 76 and gas is discharged from an end 82 of conduit 76 into viscous liquid 54. As gas is discharged, bubbles are produced in the viscous liquid and pressure variations occur in conduit 76, which are sensed and communicated electrically through electrical cable 83 back to the controller 74.

When the level of viscous liquid adhesive 54 in reservoir 56 is high, the bubbles formed by gas discharge will take a longer period of time to form. As the liquid level drops, bubbles are formed more quickly and migrate up through the viscous liquid so as to permit more gas to pass out the end 82 of the gas discharge conduit. Thus pressure fluctuations at pressure gauge 79 are more rapid as the level of viscous liquid in reservoir 54 drops. Controller 74 can monitor the pressure fluctuations at gauge 79 so as to sense when reservoir 56 is relatively full and when it is relatively empty. This in turn allows predetermined rates of bubble discharge into the viscous liquid to be used as a sensor for determining when more adhesive should be added to reservoir 56. As the adhesive is added, the rate of the bubbles will slow until it has reached a second discharge rate which can be used or indicates that the reservoir is sufficiently full that further adhesive does not need to be added to reservoir 56.

Figure 4:
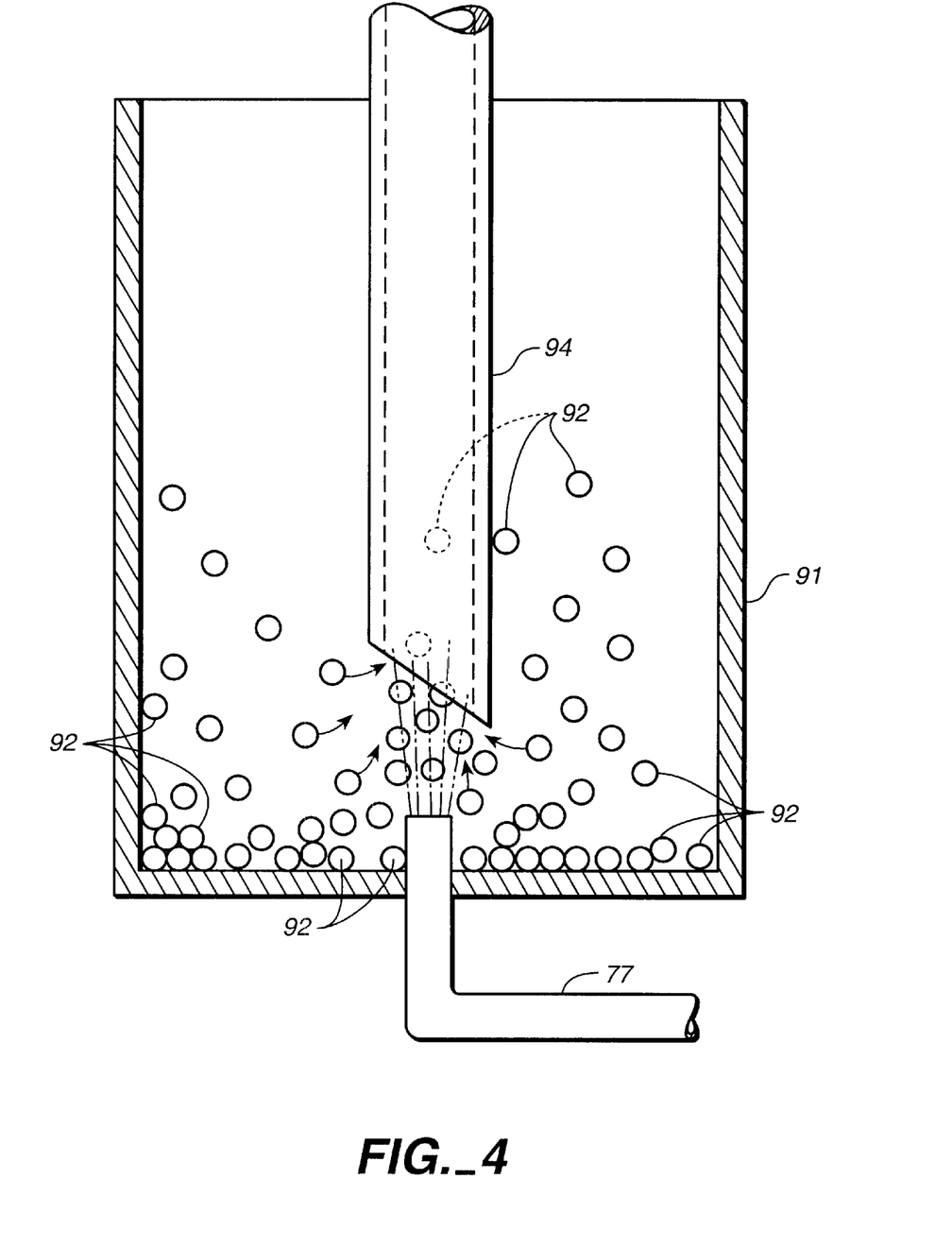
FIG. 4 is an enlarged, side elevation view of a schematic representation of a portion of an adhesive dispensing assembly suitable for use in the edge banding apparatus of FIGS. 1 and 2.

Controller 74, therefore, will respond to sensed gas pressure discharge through conduit 76 so as to turn "on" and "off" pneumatic valving which, in turn, is used to dispense more adhesive into reservoir 56 in a manner which can be described by reference to FIG. 4. In FIG. 4, a pneumatic granule dispenser is shown which can be used in connection with level sensors 71. Conduit 77 is connected from gas source 72 through controller 74 to the bottom of a granule reservoir 91. A plurality of adhesive granules 92 may be placed in reservoir 91, and conduit 77 acts as a gas stream forming conduit which blows a stream of gas into a granule discharge conduit 94.

As gas is discharged from the stream forming conduit 77 into the spaced granule discharge conduit, granules 92 are pulled into the discharge conduit 94 and become entrained in the stream of gases flowing into the discharge conduit. By placing the end of conduit 77 proximate the bottom of reservoir 91, the stream of gases discharged therefrom both stirs the adhesive granules and causes them to become entrained and blown into conduit 94. The stream of gas further acts as a conveying force which causes the granules to be pushed along conduit 94 and eventually into reservoir 76. As will be seen from FIG. 4, it is preferred that the granule discharge conduit 94 be larger in diameter than the stream forming conduit 97, but there are several configurations which could be used in the present invention to pneumatically convey granules from granule reservoir 91 to liquid adhesive reservoir 56.

In the preferred form, the gas discharge conduit 94 can be a rubber or plastic conduit, but since reservoir 56 is heated, the end 94a of conduit 94 proximate reservoir 56 desirably is formed of a metal which can withstand high temperatures. Obviously, the entire granule discharge conduit 94 could be a metal conduit.

Other configurations are suitable for entraining granules pneumatically and conveying or transporting them to reservoir 56. Thus, a horizontally oriented stream forming conduit could be surrounded by the granule discharge conduit, with an upwardly facing opening in the granule discharge conduit so that adhesive granules could gravitate and/or be pneumatically pulled into the granule discharge conduit by the stream of gas. Moreover, granules can be pneumatically fed into reservoir 56 in measured amounts in response to level sensor 71 or in a continuous, unmeasured manner controlled by sensor 71. It also will be understood that level sensor 71 could be used to drive other granular adhesive feed assemblies, such as an auger, conveyor, etc.

While a scissors type or guillotine type rough trim or banding material cutoff device could be used with edge banding assembly 21, cutoff device 25 is preferably constructed in a manner which provides enhanced safety over such prior art rough trimmers. Just downstream of banding material applying assembly 24 can be cutoff device 25. Thus, an opening 101, formed in horizontal surface 36, allows a blade mounting bar 102 to be mounted close to, but preferably below, the plane of surface 36. Mounted on bar 102 is a blade or knife member 103 presenting a sharp edge 104 facing in a direction opposed to the direction of advancement of board 26 on support structure 22.

Oriented at an angle, preferably at about 90°, to blade 103 is a disk 106 having a relatively sharp edge 107 which rollingly engages and passes down across knife edge 104. Disk 106 is rotatably attached, but not powered, at axle 108 to a guard member 109, which can be displaced through an opening 111 in board support wall 31.

In order to move cutoff device 25 outwardly across surface 36 in the direction of arrow 112, an actuator, for example a pneumatic actuator including a cylinder 113 and displaceable piston 114, can be attached by yoke 116 to guard number 109. Compressed gas may be supplied by conduit 117 through pneumatic controller 74 from gas source 72 (FIG. 2) in order to power actuator 113, 114. Guided travel of guard member 109 across slot 101 can be provided by a guide track 118.

In operation, cutoff assembly 25 cuts or rough trims edge banding material 28, which has been applied to board 26, as follows. As board 26 is advanced in the direction of arrow 33, the board encounters a limit switch 121 (FIG. 1) which is moved inwardly to wall 31 and which is electrically coupled to and signals controller 74 that a board is present and being edge banded. When end 63 of board 26 passes beyond switch 121, the switch is biased outwardly and it signals pneumatic controller 74 to power pneumatic actuator 113, 114.

Guard member 109 and disk 105 are then rapidly displaced outwardly of wall 31 along track 118, causing edge 107 of the disk to rollingly move out along, and in engagement with, blade edge 104. The sharp blade edge 104 and edge 107 of the disk cooperate to cutoff banding material 28 behind board 26, with the cut being made closely proximate end 63 of the board. This is intended, however, only to be a rough trim cut which is to be followed up by a separate final trim of the edge banding material.

Figure 5:
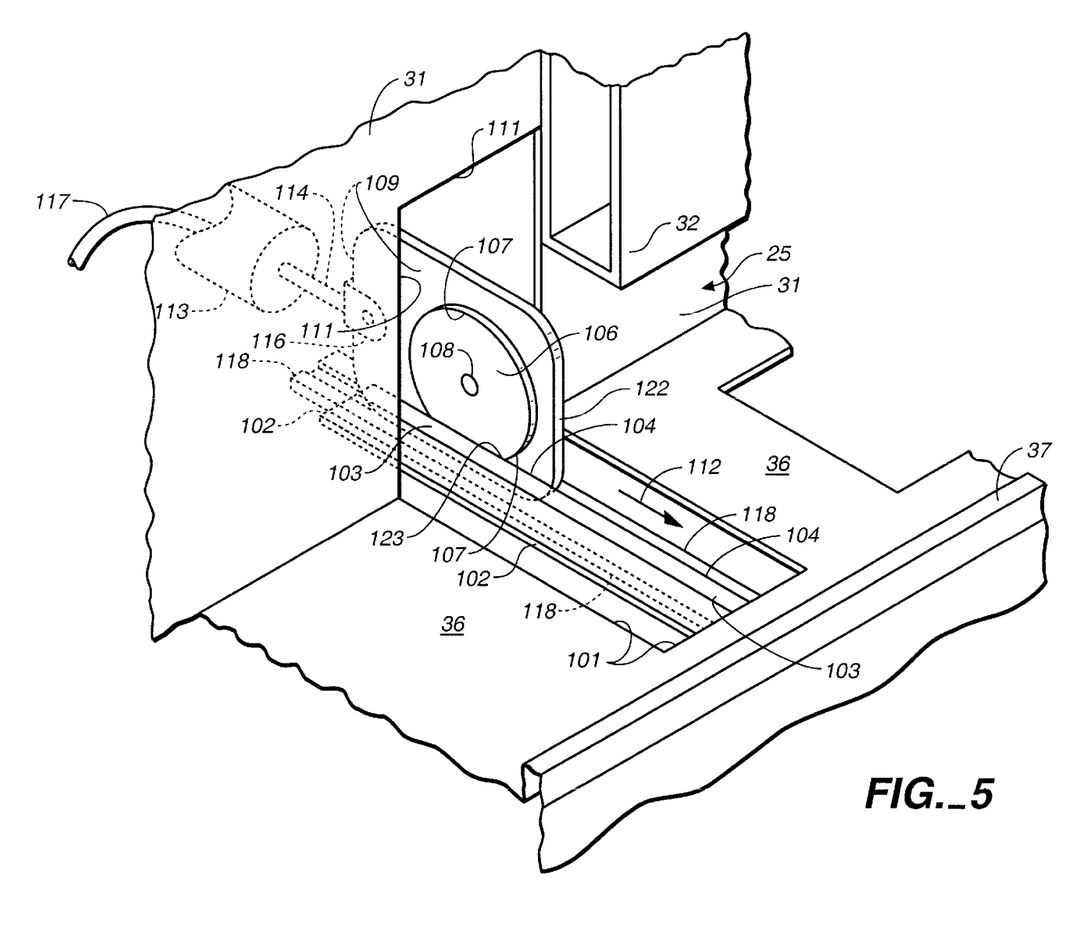
FIG. 5 is a fragmentary, top pictorial view of a schematic representation of a banding material cutoff assembly suitable for use in the edge banding apparatus of FIGS. 1 and 2.

It will be seen from FIG. 5 that, as guard member 109 moves outwardly, a front edge 122 of guard 109 precedes disk 106, that is, edge 122 extends transversely (in the direction of arrow 112) beyond disk 106. Thus, an operator—s finger or hand will be pushed outwardly in the direction of arrow 112 away from the pinch point 123 at which edge band material 28 is being cut. Moreover, disk 106 will not tend to draw a finger or the like inwardly to pinch point 123, particularly since it is not powered for rotation.

Once the full stroke of actuator 113, 114 is completed, the actuator is retracted and guard member 109 and disk 106 are returned through opening 111 to a recessed position in wall 31 allowing the next board 26 to pass beyond cutoff assembly 25 during edge banding.

Having described the apparatus of the present invention, the method of adhesively securing the banding material to the edge of the board can be set forth. The first step in the present method is to orient the board to be banded 26 in a near vertical plane for application of a banding material to a downwardly facing edge 27 thereof. Next, the step of applying adhesive to the downwardly facing edge is accomplished by moving one of the adhesive applicator 23 and board 26. As above noted, in the preferred form, board 26 is moved over adhesive applicator 23, but the applicator can also be moved relative to a stationary board. Thereafter, the present method includes the step of applying banding material 28 to downwardly facing edge 27 over the applied adhesive. Finally, after the banding material is applied, it is pressed against edge 27, for example, by pressing rollers 42 which make use of the weight of board 26, which weight is concentrated by reason of the vertical orientation of board 26. In the present method, the step of applying adhesive to edge 27 preferably is accomplished by a roller applicator 51 having a generally horizontally oriented adhesive applying peripheral surface 52. Applicator 51 evenly coats edge 27 without preferential slumping or gravitation of the adhesive to a lower side of edge 27.

In another aspect of the present invention, a method of sensing the level of viscous liquids, such as adhesive 54, is provided. The method is comprised of the steps of discharging gas into liquid adhesive 54 at a position below top surface 78 to produce bubbles in the viscous liquid. The rate of gas discharge into the viscous liquid is then determined and used to control the discharge of more adhesive into the reservoir in which the level is being sensed.

Finally, the method of the present invention includes replenishing adhesive in a reservoir which is comprised of the step of sensing the level of adhesive in the reservoir 56, for example, by using a pneumatic sensor 71. Upon sensing a predetermined adhesive level, granular adhesive is dispensed into reservoir 56 using a stream of gas to entrain the adhesive and transport it to the adhesive reservoir 56. This most preferably is accomplished by discharging the gas into a vertical stream at the bottom of a granule reservoir and into a granule transport and discharge conduit 94 spaced vertically from a stream forming conduit 77.

What is claimed is:

1. An edge banding apparatus for adhesively securing a banding material to an edge of a board comprising:
   a board support structure formed to support a board to be edge-banded in a near vertical orientation with an edge of said board in a downwardly facing orientation;
   an adhesive applying assembly positioned relative to said board support structure and formed to apply adhesive directly to said edge during relative motion between said board and said adhesive applying assembly; and
   a banding material applying assembly positioned downstream of said adhesive applying assembly and formed to apply an adhesive free band material having a width dimension substantially equal to the width dimension of said edge progressively along the length of, and only to, said edge after said adhesive is applied to said edge and during relative movement between said board and said banding material applying assembly.

2. The edge banding apparatus of claim 1 wherein,
   said board supporting structure supporting the board from a vertical plane by an amount in the range of about 3° to about 10° toward board supporting surfaces, said board supportive surfaces being formed for sliding support of said board during movement along said board supporting structure and being formed to cause the weight of said board to bear upon said banding material after said banding material has been applied to said edge.

3. The edge banding apparatus of claim 1 wherein,
   said adhesive applying assembly includes an adhesive reservoir, an applicator device for applying adhesive in said reservoir to said edge of said board, and a reservoir refilling assembly, said adhesive applying assembly further including a heater positioned to heat adhesive contained in said adhesive reservoir, said adhesive reservoir having a relatively small volume and being removably mounted on said heater.

4. The edge banding apparatus of claim 3 wherein,
   said reservoir refilling assembly includes an adhesive level sensor positioned to sense the level of adhesive in said reservoir, said level sensor being provided by a gas discharge assembly positioned to discharge a gas into said adhesive below a top surface of said adhesive to produce bubbles therein-and a pressure sensor formed to sense the rate of discharge of gas into said adhesive, and an adhesive dispenser responsive to said level sensor to refill said reservoir with adhesive when said sensor determines that the level of adhesive is below a predetermined level.

5. The edge banding apparatus of claim 1, and a banding material cutoff assembly positioned proximate and downstream of said banding material applying assembly, said cutoff assembly being formed to sense an aft end of said board and to automatically cutoff said banding material closely proximate said aft end upon passage of said aft end beyond said cutoff assembly.

6. The edge banding apparatus of claim 5 wherein,
   said cutoff assembly includes a knife edge and a disk having an edge mounted to cooperatively engage said knife edge to cut said banding material,
   said disk being mounted for rotation to a support member, and said support member being mounted for translation along said knife edge for rotating translational engagement of said disk edge with said knife edge.

7. The edge banding apparatus of claim 6 wherein,
   said support member is provided by a guard member formed to project outwardly beyond said disk in a direction of translation of said disk along said knife edge during cutting.

8. The banding apparatus of claim 6 wherein,
   said knife edge is mounted below and proximate said edge as supported for edge banding, said knife edge facing in a direction opposed to movement of said board during edge banding for positioning closely proximate and below said aft end of said board, said disk edge is facing in the direction of movement of said board during edge banding for positioning of said disk edge closely proximate said aft end of said board to cutoff said band material substantially flush with said aft end, and said guard member is on a side of said disk facing away from said board when said board passes said disk so as not to engage said board during cutoff.

9. An edge banding apparatus for adhesively securing a banding material to an edge of a board comprising:
   a board support structure formed to support a board to be edge-banded in a near vertical orientation with an edge of said board in a downwardly facing orientation;
   an adhesive applying assembly positioned relative to said board support structure and formed to apply adhesive to said edge during relative motion between said board and said adhesive applying assembly, said adhesive applying assembly including an adhesive reservoir, an applicator device for applying adhesive in said reservoir to said edge of said board, and a reservoir refilling assembly including a granular adhesive dispenser; and
   a banding material applying assembly positioned downstream of said adhesive applying assembly and formed to apply a banding material to said edge after said adhesive is applied to said edge during relative movement between said board and said banding material applying assembly.

10. The edge banding apparatus of claim 9 wherein, said granular adhesive dispenser is provided by a pneumatic dispenser device formed to transport granules of adhesive from a granule reservoir to said adhesive reservoir by pulling granules into a granule dispensing conduit using a stream of a gas.

11. The edge banding apparatus of claim 9 wherein, said applicator device includes an applicator roller mounted partially immersed in a liquid adhesive in said adhesive reservoir and positioned to rollingly engage said edge, said adhesive applying assembly further including an adhesive level sensor formed to discharge a gas below the surface of said liquid adhesive in said adhesive reservoir and formed to sense the rate of gas discharged into said liquid adhesive, and said granular adhesive dispenser is pneumatically powered and coupled and responsive to said adhesive level sensor to pneumatically discharge adhesive granules into said adhesive reservoir upon sensing of a predetermined rate of gas discharge into said liquid adhesive.

* * * * *